Oct. 7, 1952     P. E. MORGAN     2,612,696
WORKPIECE AREA MEASURING MACHINE
Filed Jan. 11, 1950
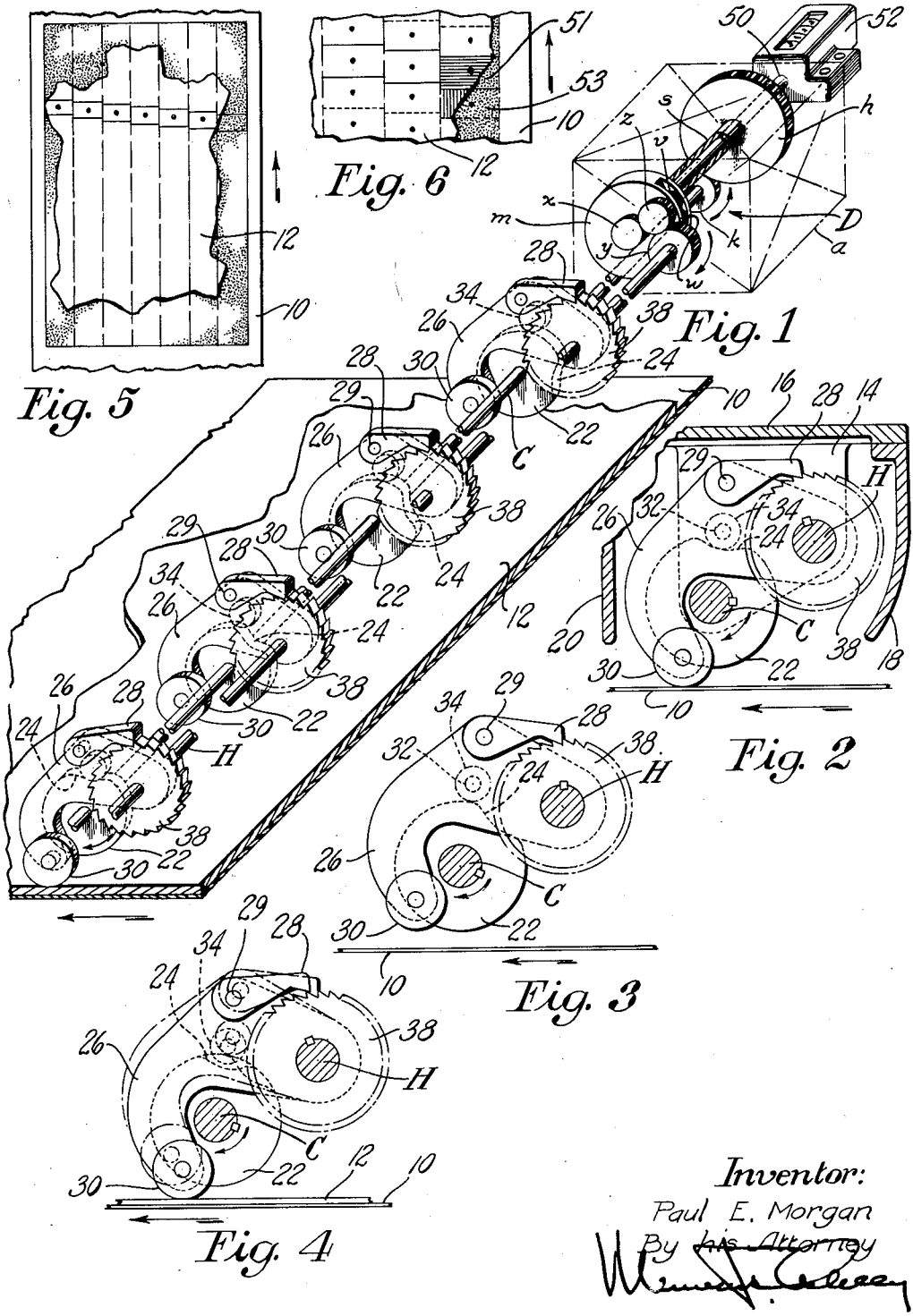
Inventor:
Paul E. Morgan
By his Attorney Patented Oct. 7, 1952

2,612,696

UNITED STATES PATENT OFFICE 2,612,696

WORKPIECE AREA MEASURING MACHINE

Paul E. Morgan, Melrose, Mass., assignor to United Shoe Machinery Corporation, Flemington, N. J., a corporation of New Jersey Application January 11, 1950, Serial No. 137,988

5 Claims. (Cl. 33—121)

This invention relates to machines for measuring work pieces of irregular contour, and more particularly to machines for making an approximate determination of the superficial area of consecutively presented work pieces such as hides or skins.

Machines currently being used in the tanning industry for measuring the superficial area of hides and skins are costly, complicated in structure, and occupy considerable floor space. Machines of this type are shown in the Patents to W. A. Sawyer, No. 286,078, and L. O. Ramsdell, No. 931,144. In such machines consistency and accuracy of measurement are desirable and the size and cost of the equipment are justified in the use for which that equipment was designed. Area of the work is an important factor in determining the value of hides or skins and machines of the Sawyer or Ramsdell type are sufficiently accurate to satisfy the industry in this respect. There are situations, however, where a high degree of accuracy in measurement is not essential and where cost and size of customary leather measuring machines are prohibitive. In many instances it is highly desirable to know the approximate quantity of work output or capacity of a given through feed tannery machine such as a buffer, dust removal machine, glazer or the like. A mere counting of the number of units of work or the number of hides or skins treated is not adequate as the work pieces vary considerably not only in thickness but also in superficial area and the latter factor is the real criterion in determining the output or productivity of most tannery machines. A small area measuring machine which is approximately or at least roughly accurate and which is reliable, inexpensive, and easily combined with a conventional tannery machine to determine the latter's output has been thought desirable but no such machine has heretofore been available.

It is an object of the invention to provide an area measuring machine which may be part of a through feed work treating machine to determine the output of the latter with reasonable and satisfactory accuracy for some purposes.

To this end, and in accordance with an important feature of the invention, a measuring machine is provided two shafts of which are mounted parallel and adjacent to the path of the work support or conveyor forming a part of the tannery mechanism the output of which is to be measured and means are provided in that measuring machine for contacting consecutive unit areas of the conveyor to determine the presence or absence of work in each of said unit areas and to register in accordance with that determination the area of work being conveyed. Another feature of the invention is an area measuring device in combination with a work treating machine, the latter utilizing a work supporting surface which is part of a table, roll or conveyor belt for conveying work into, away from or through a treatment zone and along a given path.

These and other important features of the invention will be described in detail in the specification and pointed out in the claims.

In the drawings,

Fig. 1 is a perspective view, with some parts broken away, of a measuring machine incorporating applicant's invention;

Fig. 2 is a sectional view showing some of the operative parts in Fig. 1 with the casing in which the parts are mounted, all being drawn to an enlarged scale;

Fig. 3 is a view similar to Fig. 2 but with the casing omitted and the parts as relatively located during a different portion of the operative cycle;

Fig. 4 is a view similar to that of Fig. 3 but with two positions of the parts being shown;

Fig. 5 is a plane view of a conveyor belt with a spread-out hide placed thereon to aid in illustrating the manner of measurement used in employing the present invention; and Fig. 6 is a plan view of part of a conveyor belt and a portion of a work piece with the measurement units into which both are theoretically divided.

In through feed tanning machinery it is customary to have a power driven work piece conveyor such as a feed roll, a table or an endless belt. In the drawings such a support is shown as an endless belt or work support 10 which is adapted to support in spread-out condition a hide or skin 12 the superficial area of which is to be measured. The present invention is applicable whether the conveyor be a belt, table or roll each of which is capable of momentarily supporting at least a portion of a work piece in a given plane for measurement.

Parallel with and transverse to the path of the work support 10 (see the arrows in Figs. 1 to 6) is mounted a measuring machine incorporating the features of the present invention. This machine comprises two parallel shafts C and H placed in planes transverse to the path of the work support. These two shafts are journaled in brackets 14 (Fig. 2—only one shown) suspended from the cover 16 of a casing having front and back sides 18 and 20. The casing is adapted to be supported on the frame of a work treating machine. The shaft C is a power shaft driven from a source of power (not shown) and it is adapted to be driven at a speed proportional to the speed of the conveyor belt 10. It is preferable that the shaft C and the surface of the conveyor be driven at constant speeds but this is not essential. It is necessary that the speed of the shaft C bear a definite relation to that of the work support.

Evenly spaced along the line of the power shaft C are cam members 22. The spaces are dependent upon the units of measurement chosen as will further appear. These cam members have depressions 24 so placed that each cam is individually active 30° later (as an example and if there are twelve cams 22) than the preceding cam.

Alongside of each cam 22 is located an arm or lever 26 freely pivoted on the shaft H (herein called a secondary shaft) and provided with a pawl 28 pivoted thereon at 29 and a work contacting roller 30. The rollers or spaced contactors 30 together with the arms 26 constitute work engaging elements or means for intermittently contacting the surface of either the conveyor 10 or the work piece 12 once within each theoretical measuring unit as will further appear. Each of the spaced levers 26 is provided with a stub shaft 32 (Figs. 2 and 3) supporting a roller 34 which is arranged to coact with the exterior cam surface of its corresponding cam 22.

Adjacent to each of the spaced levers 26 is a ratchet wheel 38 keyed to the secondary shaft H and having its teeth in engagement with the end of the corresponding pawl 28.

The arrangement of the parts is such that rotation of a cam 22 will cause the corresponding lever 26 to swing through a definite arc about the center of the shaft H. In the absence of leather or a work piece beneath the roller 30 the range of movement or the arc of movement of the lever 26 is such that the pawl 28 will rotate the ratchet wheel 38 one tooth. Fig. 2 shows the position of the parts with no leather present and the pawl 28 engaging a tooth as the roller 34 drops into a cam depression 24. Fig. 3 illustrates that the action of the cam 22 causes the pawl 28 to rotate the shaft H from its position as shown in Fig. 2 by one tooth on the ratchet wheel 38.

If a hide 12 is present on the conveyor belt 10, however, the roller 30 (see Fig. 4) is not permitted to drop down to the belt but is stopped by the hide and for this reason the range of movement of the pawl 28 is insufficient for that pawl to engage the next tooth on the ratchet wheel. The end of the pawl will therefore slide back and forth upon the single tooth of the ratchet wheel 38 and cause no rotation of the shaft H.

Although not illustrated in the drawings, in the interest of making a clear disclosure, eccentric adjustments at pivot points 29, stub shafts 32 and for roller 30 may be provided.

The two shafts H and C are connected to a differential gearing D such as schematically shown in the box a drawn in dot-and-dash lines. The type of differential gearing is not material and does not form part of the present invention. Suitable differential gearing may be purchased on the market and are frequently used for the operation of diverse types of mechanical instruments. Small mechanical differentials for instrument and control work of the type which may be employed are produced by the Milwaukee Lock and Manufacturing Company, of Milwaukee, Wisconsin. The output shaft 50 of the differential gearing D is connected to a counter 52 which may be such as to read in any desired units of area.

For a clear understanding of the method of measurement utilized in carrying out the present invention reference is here made to Figs. 5 and 6 of the drawings. In Fig. 5 the conveyor belt 10 is shown as being theoretically divided into seven strips longitudinal of a hide 12 placed thereon. Transverse to the path of movement of the conveyor belt 10 as indicated by the arrow, the seven strips are theoretically divided into equal rectangular areas which are to serve as the units of area measurement. It will be noted that each transverse row of these rectangular areas is not arranged normal to the path of belt travel. Each of the rollers 30 is adapted to contact the center of one of these rectangles. Contact with the consecutive rectangles of a row is achieved by the proper angular realtion of the cam depressions 24 with relation to the shaft C. The shafts C and H are normal to the path of the conveyor belt 10 but the work contact points are not.

Fig. 6 shows the effect of an irregular edge of a work piece in applying the principles of the present invention. It will be noted that the rectangular area 51 would be considered as a full rectangle of work piece area as a roller 30 momentarily contacts or detects the center of that rectangle only. This would obviously cause an incorrect result but the inaccuracy is offset by the subsequent exclusion of the only partially work covered area of rectangle 53, the center of which is not on the hide or work piece.

Assuming that the conveyor belt in a through feed type machine is eighty inches wide it may be well to provide a machine with twelve equally spaced surface contactors or rollers 30 (six inches apart). The power shaft C will then have twelve cams 22 and that shaft would make one revolution per six inches of conveyor travel through the work feed plane and each cam would be active 30° later than its preceding cam. In every six inches of conveyor travel the cams 22 in sequence would cause their corresponding rollers or work contacting means 30 to drop momentarily and contact the work support 10 or the work piece 12. This would individually detect or determine the presence or absence of work piece substance in each of the rectangles across the work piece—i. e., a plus or minus unit of measurement. If a roller 30 contacts an uncovered portion of the belt 10 the roller 30 would drop to its position as shown in Fig. 2. This would allow the pawl 28 to engage the next tooth of the ratchet wheel 38 so that as the roller 30 and its arm 26 are lifted by the cam the ratchet wheel is indexed one tooth. All ratchet wheels of course work in sequence on the shaft H. The two shafts C and H operate in opposition to each other through the differential D. The shaft C measures all available space on the belt which passes beneath the rollers 30. The shaft H measures all the unoccupied space on the belt 10 and the differential drive output shaft 50 is rotated in amount dependent upon the difference or the occupied space on the belt or the work piece area. The shaft 50 is therefore connected to a counter which registers the area directly and in the units desired. In short, rotation of the shaft C measures an X amount of available space on the belt 10. The rotation of the shaft H determines the Y amount of empty space on the belt. A subtraction of Y from X through action of the differential gearing D determines the amount of space on the belt 10 which is occupied by the leather or work piece 5, and that amount or the work piece area is registered by the counter 52.

With the specific type of differential gearing D illustrated, the shaft C is arranged to drive the gear $h$ through a small gear $k$. The gear $h$ and gear (not shown) within the casing $m$ are arranged to be driven together because of a hollow shaft $s$ connecting the two. The gear referred to (within the casing $m$) is arranged to drive a planet gear $v$ which is engaged with a second planet gear $w$. The teeth of the gear $w$ are in mesh with the teeth of a second gear concealed in and concentric with the casing $m$ and this second gear is arranged to rotate together with a gear $x$ mounted outside the casing $m$ and freely journaled on the shaft 50. The two gears concealed within the casing $m$ are separated by a partition (not shown) which is part of the casing $m$. This partition is attached to the shaft 50 to rotate therewith. The secondary shaft H is arranged to drive a gear $y$ which drives the gear $x$ through an idler gear $z$. With this construction and no leather being present on the belt 10, the rotation of shaft H counteracts the rotation of the shaft C and as a result the shaft 50 does not rotate and the correct reading on the counter 52 will be zero.

Having thus described my invention, what I claim as new and desire to secure by Letters Patent of the United States is:

1. A machine for measuring the area of a work piece such as a hide or a skin comprising a work support arranged to convey said work piece in spread-out condition through a plane of measurement, a power shaft placed parallel to said plane and arranged to be rotated at a speed proportional to the speed of the work support, a secondary shaft mounted in parallel relation with said power shaft, each of said shafts being in planes transverse to the path of the work support, a moveable element, means driven by said power shaft for moving said element and causing intermittent contact thereof with the work, mechanism operated by said movable element effective to rotate said secondary shaft an amount dependent upon the extent of work piece area being measured, and means for registering the rotation of said shafts as a measurement of the work piece area.

2. A machine for measuring work piece area comprising a power driven work piece conveyor, a power shaft and a secondary shaft, each arranged parallel with and transverse to the path of the conveyor, a lever pivoted on said secondary shaft and carrying a roller, cam means on said power shaft arranged to move said lever and bring said roller in intermittent contact with said conveyor or work piece, means connecting said lever to said secondary shaft to rotate the latter by operation of said cam means subsequent to each contact of the said roller with the said conveyor, and means for registering the rotation of said shafts as a measurement of the work piece area.

3. A machine for measuring the area of a work piece such as a hide or skin comprising a power driven work piece conveyor, a power shaft and a secondary shaft mounted in parallel relation and transverse to the path of the conveyor, spaced levers pivoted on said secondary shaft and extending over the said power shaft, a ratchet wheel non-rotatively fixed on and with respect to said secondary shaft adjacent to each of said levers, a roller and a pawl pivoted to each lever with the roller arranged in contiguous relation with said work piece or said conveyor and said pawl engaging the teeth of the corresponding ratchet wheel, a cam adjacent each lever and fixed to rotate with the power shaft, said cam being arranged to operate one of said levers and move the corresponding roller intermittently in and out of contact with the work, and means for registering the rotation of said shafts as a measurement of the work piece area.

4. A machine for measuring the area of a spread-out work piece comprising a work supporting and conveying surface, two parallel shafts extending over and transverse to the path of said supporting surface, one of said shafts being arranged to be rotated at a speed proportional to the speed of the said surface, mechanism cooperatively connecting the two shafts and contacting the uncovered portion of said surface for intermittently rotating the other shaft an amount proportional to the amount of area of said portion, and means for registering the rotation of said shafts as a measurement of the area of the work piece as conveyed on said surface.

5. A machine for measuring the area of work pieces such as hides and skins as such work pieces are fed in a given plane, said machine including a frame, two parallel shafts journaled on said frame, work engaging elements in pivotal and spaced relation along said shafts, one of said shafts being power driven and provided with means for moving said elements individually and intermittently toward and from said plane of work feed different amounts dependent upon the presence or absence of work in said plane, means for imparting to said other shaft movements of rotation in accordance with the movements of said elements, differential gearing operated by said two shafts, and registering means driven by said gearing, said machine being adapted to be installed with the said shafts in parallel and adjacent relation to a work supporting surface for conveying consecutive spread-out work pieces through said plane.

PAUL E. MORGAN.

REFERENCES CITED

The following references are of record in the file of this patent:

UNITED STATES PATENTS

| Number | Name | Date |
|---|---|---|
| 813,099 | Kreil | Feb. 20, 1906 |
| 1,351,732 | Barker et al. | Sept. 7, 1920 |
| 1,412,095 | Thun | Apr. 11, 1922 |
| 1,540,351 | McFall | June 2, 1935 |
| 2,078,335 | McCabe | Apr. 27, 1937 |
| 2,360,545 | Bond et al. | Oct. 17, 1944 |